United States Patent
Rose et al.

(10) Patent No.: US 6,248,994 B1
(45) Date of Patent: Jun. 19, 2001

(54) METHOD AND APPARATUS FOR DETERMINING ANGULAR DISPLACEMENT, SURFACE TRANSLATION, AND TWIST

(75) Inventors: Bjarke Rose, Lyngby; Gulam Husain Imam, Frederiksberg; Vagn Steen Grüner Hanson, Fakse, all of (DK)

(73) Assignees: Ibsen Micro Structures A/S, Farum; Forskningscenter Riso, Roskilde, both of (DK)

( * ) Notice: Subject to any disclaimer, the term of this patent is extended or adjusted under 35 U.S.C. 154(b) by 0 days.

(21) Appl. No.: 09/440,574

(22) Filed: Nov. 15, 1999

Related U.S. Application Data

(63) Continuation of application No. PCT/DK98/00191, filed on May 15, 1998.

(30) Foreign Application Priority Data

May 16, 1997 (DK) .................................................. 0565/97

(51) Int. Cl.[7] .................................................. G01P 3/36
(52) U.S. Cl. ........................................ 250/231.13; 356/28
(58) Field of Search ........................ 250/231.13, 231.16, 250/208.1, 208.2; 356/27, 28, 28.5, 35.5

(56) References Cited

U.S. PATENT DOCUMENTS

| 3,419,330 | * | 12/1968 | Schneider | 356/28.5 |
|---|---|---|---|---|
| 3,804,518 | * | 4/1974 | Meyr | 356/28 |
| 4,525,068 | * | 6/1985 | Mannara et al. | 356/35.5 |
| 5,449,900 | | 9/1995 | Halliwell | 250/231 |
| 5,636,014 | * | 6/1997 | Hanson | 356/28 |

FOREIGN PATENT DOCUMENTS

| 0024167A2 | 2/1981 | (EP) . |
|---|---|---|
| 8402159-1 | 10/1985 | (SE) . |
| WO 9408244A1 | 4/1994 | (WO) . |

* cited by examiner

Primary Examiner—John R. Lee
(74) Attorney, Agent, or Firm—Finnegan, Henderson, Farabow, Garrett & Dunner, L.L.P.

(57) ABSTRACT

A method and apparatus for determining angular displacement of one or more parts of an object (10) comprising detecting in at least one first image sensor first and second one or more distributions of Fourier-transformed speckles before and after angular displacement, respectively, and determining the displacement of the detected images; a method and apparatus for determining twist of a rotating shaft between two or more parts of the shaft subjected to a load; a method and apparatus for simultaneously determining angular displacements and surface translations of one or more parts of an object, and a method of determining the radius of angular displacement of one or more parts of an object.

29 Claims, 12 Drawing Sheets

METHOD AND APPARATUS FOR DETERMINING ANGULAR DISPLACEMENT, SURFACE TRANSLATION, AND TWIST

This application is a continuation of International Application PCT/DK98/00191, filed May 15, 1998, the content of which is incorporated herein by reference.

1. BACKGROUND OF THE INVENTION

The present invention relates to a method and apparatus for determining angular displacement of one or more parts of an object, said method comprising directing at least one beam of electromagnetic radiation towards one or more parts of the object, detecting speckles from the object surface in at least one first image sensor, and determining one or more speckle displacements before and after the angular displacements of said one or more parts of the object as a function of the angular displacements.

The invention also relates to a method of determining twist of a rotating shaft subjected to a load; a method of simultaneously determining angular displacements and surface translations of one or more parts of an object; and a method of determining the radius of angular displacement of an object.

1. The Technical Field

Generally, determination of angular displacement of an object using speckle displacement comprises illumination of the surface of the object by a laser beam. The reflected laser beam generates a speckle pattern which is detected in a linear image sensor. After angular displacement of the object, the displaced speckle pattern is detected in the linear image sensor. The two speckle patterns are then cross-correlated to determine the angular displacement which is provided by the displacement giving maximum cross-correlation.

A drawback of this method is that the determination of the angular displacement depends on the distance from the linear sensor to the object, movements of the object, the radius of displacement, as well as the shape of the object.

2. Prior Art Disclosures

Hayashi and Kitagawa, "High Resolution Rotation-Angle Measurement of a Cylinder Using Speckle Displacement", Applied Optics, Vol. 22, 1983, p. 3520–3525, disclose a method for measuring the rotation angle of a cylinder, particularly a small rotation angle with high resolution based on the speckle displacement detection in the (near) diffraction field caused by rotation of the cylinder surface. The light intensity distributions of speckles before and after the cylinder surface displacement are detected by a detector array, and displacement of the speckle pattern is measured by computing their cross-correlation function.

Yamaguchi and Fujita, "Laser Speckle Rotary Encoder", Applied Optics, Vol. 28, No. 20, 1989, p. 4401–4406, disclose a method and apparatus for measuring small rotation angles of a cylinder by detecting displacement of the speckles which appears in the diffraction field of the surface illuminated by a narrow laser beam. The speckle pattern is detected by a linear sensor whose output is cross-correlated before and after the rotation of the cylinder. A resolution of 2 millidegrees is reported.

In both of these prior art techniques, the angular displacement measurement is dependent of the distance of the linear sensor to the cylinder being measured, longitudinal and transversal movements of the cylinder, its radius, and the shape of the object.

2. DISCLOSURE OF THE INVENTION

Object of the Invention

In an aspect, it is an object of the present invention to provide an improved method and apparatus for determining angular displacements of one or more parts of an object.

It is a further object of the present invention to provide such a method and apparatus for which the angular displacement determination is independent of the distance to the object, any longitudinal and transversal movements of the object, the shape of the object, and the radius of angular displacement.

In another aspect, it is the object of the present invention to provide a method and apparatus for determining twist of an object, in particular for determining twist of a rotating object, e.g. a driving shaft, under load.

In still another aspect, it is the object of the present invention to provide a method and apparatus for determining both angular displacement and surface translation of one or more parts of an object, in particular for determining the radius of angular displacement thereof.

Further objects will appear from the description of the invention and its preferred embodiments.

Solution According to the Invention

According to an aspect of the invention, there is provided a method for determining angular displacements of one or more parts of an object, said method comprising a) directing at least one beam of substantially coherent and substantially parallel electromagnetic radiation towards said one or more parts of the object positioned in a first position;

b) detecting in at least one first image sensor first one or more distributions of speckles provided by at least a part of the electromagnetic radiation scattered from said one or more parts of the object in said first position;

c) angular displacing ($\theta,\phi$) said one or more parts of the object in a second position;

d) detecting in said at least one first image sensor second one or more distributions of speckles provided by at least a part of the electromagnetic radiation scattered from said angularly displaced one or more parts of the object in said second position; and e) determining one or more displacements ($\Delta x$, $\Delta y$) of the first and second detected distributions of the speckles as a function of the angular displacements of said one of more parts of the object between said first and second positions;

wherein f) the at least a part of electromagnetic radiation scattered from said one or more parts of the object is Fourier transformed by at least one Fourier-transforming means having a Fourier plane, and g) the at least one image sensor is being positioned in a detector plane in or near said Fourier plane of said at least one Fourier-transforming means.

According to another aspect, there is provided an apparatus for determining angular displacements of one or more parts of an object; said apparatus comprising:

a) means for directing at least one beam of substantially coherent and substantially parallel electromagnetic radiation towards said one or more parts of the object;

b) at least one first image sensor for detecting first and second one or more distributions of speckles provided by at least a part of the electromagnetic radiation scattered from said one or more parts of the object before and after they are being angularly displaced;

c) means for determining displacements of the detected first and second one or more distributions of speckles as a function of the angular displacements of said one or more parts of the object;

d) means for Fourier-transforming at least a part of the electromagnetic radiation scattered from said one or more parts of the object; said means having a Fourier plane in or near the plane of the detecting means of the first and second one or more distributions of speckles.

It has surprisingly turned out that if (f) at least a part of the electromagnetic radiation scattered from said one or more parts of the object is Fourier transformed by a least one Fourier-transforming means having a Fourier plane, and that if (g) at least one image sensor is being positioned in a detector plane in or near said Fourier plane of said at least one Fourier-transforming means, it is obtained that determination of the angular displacement is independent of the distance to the object, any longitudinal and transversal movements of the object, the wavelength of the source, the shape of the object, and the radius of angular displacement.

Fourier-Transforming Means

Generally, according to the invention, the Fourier-transforming means comprises means for providing a Fourier-transformation of the scattered electromagnetic radiation giving rise to linearly displaced speckles due to an angular displacement of the object.

Or equivalently, the Fourier-transforming means comprises means for Fourier-transforming the angle of direction of the speckles generated by the scattered electromagnetic radiation into a linear coordinate of the speckles near or in the Fourier plane.

In a preferred embodiment, the linear coordinates of the Fourier-transformed speckles are the distances of speckles to the optical axis of the Fourier-transforming means, said optical axis being both perpendicular to the Fourier plane and perpendicular to the axis of angular displacement.

Fourier-transforming means are known in the art, see J. W. Goodman, "Introduction to Fourier Optics", McGraw-Hill, 1996.

In a preferred embodiment, the Fourier-transforming means comprises an optical Fourier-transforming device which Fourier transforms incoming light in the Fourier plane of the device, i.e. in a plane typically coinciding with the focal planes of the Fourier-transforming device.

Fourier-transforming devices comprise refractive, reflective, and diffractive optical elements, and active liquid crystals, e.g. as disclosed in Goodman, ibid.

Preferred Fourier-transforming refractive optical elements are selected from refractive lenses whereby simple and readily available optical elements can be used. Refractive convex lenses or cylinder lenses are preferred, whereby simple systems can be made with standard components.

Reflective systems can be designed by using a parabolic mirror and placing the linear image sensor in the focal point.

Preferred Fourier-transforming diffractive optical elements are selected from diffractive zone plates and holographic lenses, both of which may be computer generated, whereby particularly Compact and robust Fourier-transforming means can be provided. Holographic lenses are preferred. Spherical as well as cylinder lenses can be implemented with diffractive optics.

In a preferred embodiment, wherein the Fourier-transformed speckles provided by surface elements of one or more parts of the object having different positions along the axis of angular displacement are additionally imaged into corresponding positions of the first image sensor, whereby it is obtained that the distribution of angular displacements along one direction of more parts of an object, typically closely spaced surface elements of the irradiated part of the object, can be determined simultaneously.

In a particular preferred embodiment, the imaging is performed in one direction while maintaining Fourier-transformation in a direction perpendicular thereto.

In a preferred embodiment, the Fourier-transforming device and the imaging means are incorporated in a diffractive optical element, whereby a particular compact and robust embodiment is obtained. Methods for incorporating optical elements i n diffractive optical elements are known in the art, see e.g. M. T. Gale, "Diffractive Microstructures: Fabrication and Application", Schweizerische Gesellschaft für Mikrotechnik (SGMT) Bulletin 17, May 1993.

In a preferred embodiment, the Fourier-transforming means, further comprises telescopic means to magnify or reduce the Fourier plane. This is particularly useful for scaling the speckle size to the pixel size of the detector, whereby the maximum resolution can be obtained.

Directing Electromagnetic Radiation Towards the Object

According to the invention, at least one beam of substantially coherent and substantially parallel electromagnetic radiation is directed towards one or more parts of the object positioned in a first position.

Suitable electromagnetic irradiation of the object can be provided by methods known in the art.

More beams of the electromagnetic radiation may be directed towards more parts of the object for simultaneous or subsequent determination of angular displacements of each part.

The electromagnetic radiations can be generated by the same or different sources.

In a preferred embodiment, a laser source provides a beam of substantially coherent electromagnetic radiation which beam is split up into two beams irradiating two different parts of the object whereby a particular apparatus can be provided.

(a) Substantially Coherent Electromagnetic Radiation

According to the invention, the beam of electromagnetic radiation is substantially coherent for the generation of speckles by constructive and destructive interference of the individual components of the electromagnetic radiation scattered by the object.

If the beam is completely coherent, the modulation depth of the speckles in the Fourier plane approaches unity, which provides a corresponding high modulation in e.g. the cross-correlation of the detected images of the first and second distributions of the speckles between the first position and the second position of the angularly displaced object.

If the beam is not sufficiently coherent, the modulation depth of the speckles is low. Consequently, the modulation depth of e.g. the cross-correlation of the detected images decreases, and the pixel position providing maximum cross-correlation is determined with less accuracy and precision.

Whether the degree of coherence is sufficient for a specific application, e.g. a specific object surface, can be determined by the skilled person according to the methods known in the art, see e.g. J. W. Goodman, "Laser Speckle and Related Phenomena", J. C. Dainty, ed. (Springer-Verlag, Berlin, 1984), Chap. 2.

It is preferred that the electromagnetic radiation is provided by a laser source, whereby an intensive, parallel beam can be provided. Further, the wavelength can be matched to the spectral sensitivity of the image sensor.

Suitable laser sources can be selected by a skilled person for a given application, in particular considering coherence and divergence.

It should be noted that within the present context, the term "substantially coherent electromagnetic radiation" includes incoherent electromagnetic radiation having an induced spatial and temporal coherence. It turns out that the electromagnetic radiation source can be incoherent provided that the spatial coherence length approaches the size of the illuminating spot, and that the temporal coherence length exceeds the depth of the illuminated part of the object.

(b) Substantially Parallel Electromagnetic Radiation

According to the invention, the beam of substantially coherent electromagnetic radiation is substantially parallel.

A non-parallel beam can be accepted, i.e. a diverging or a converging beam. However, if the beam is not sufficient parallel, the determination of the angular displacement becomes dependent on the distance to the object and on the radius of displacement of the object, even when the image sensor is positioned exactly in the Fourier plane.

The skilled person can determine whether or not a beam is sufficiently parallel for a given application by methods known in the art.

(c) Wavelength of this Electromagnetic Radiation

The wavelength of the electromagnetic radiation can be any wavelength suitable of generating speckles in the Fourier plane of the Fourier-transforming means from the electromagnetic radiation scattered from the object surface. The sensitivity of the image sensor has to match the wavelength of the electromagnetic radiation.

In a preferred embodiment, the wavelength is a short wavelength, preferably in the range of 0.4 $\mu$m to 1.6 $\mu$m where suitable image sensors are available.

Preferred source of substantially coherent electromagnetic radiation comprises laser sources, in particular diode lasers, solid state lasers, and gas lasers.

Detection of Distributions of Speckles in Image Sensors

According to the invention, first and second one or more distributions of speckles provided by at least a part of the electromagnetic radiation scattered from said one or more parts of the object in a first position and in a second position after angular displacement, respectively, are detected in at least one first image sensor.

In a particular aspect of the invention, angular displacements and surface translation of one or more parts of an object are determined simultaneously. For this aspect, a second image sensor is positioned in or near the image plane of the object.

The first and second image sensors can be equal or different.

In preferred embodiments, the image sensor consists of one- or two-dimensional array detectors.

In a particular preferred embodiment, the sensitive area of a single detector, pixel, of the array detector has a size which is comparable with the size of a speckle in or near the Fourier plane, whereby a better resolution is obtained.

In another preferred embodiment, the image sensor is a one-element detector having a short integration time, e.g. a silicon detector, which provides a successively detected image of a timely varying distribution of speckles scattered from a rotating object.

Preferred embodiments of the first and/or second image sensors comprises array detectors, both one or two one-dimensional array detectors, and two-dimensional array detectors.

In a particular preferred embodiment, the first and/or second image sensor comprises at least one one-element detector connected to a shift register.

Angular Displacement

According to the invention, one or more parts of the object is angularly displaced.

Generally, the angular displacement can be any angular displacement having a corresponding displacement axis.

In preferred embodiments, the angular displacement is determined in one or two dimensions.

In another preferred embodiment, the distribution of angular displacements of more surface elements of the irradiated one or more parts of the object displacement is determined.

In a particular aspect of the invention, the relative shift in angular displacements of two or more parts of a rotating object, in particular a rotating shaft, subjected to a load is determined.

Determination of Angular Displacement

According to the invention, one or more displacements between the first and second distributions of the Fourier-transformed speckles detected in the first image sensor, or the speckles detected in the second image sensor, are obtained by cross-correlating the detected images thereof as a function of the angular displacements of said one or more parts of the object between said first and second positions.

Suitable cross-correlation techniques of electronically recorded and sampled images are known in the art, see J. S. Bendat and A. G. Piersol, "Random Data Analysis and Measurement Procedures", (John Wiley & Sons, 1986).

In a preferred embodiment, cross-correlation is performed by a method disclosed in M. Sjödahl, "Electronic Speckle Photography: Increased Accuracy by Nonintegral Pixel Shifting", Applied Optics, Vol. 33, 1994, p. 6667–6673, whereby an automatic determination of the pixel position of maximum cross-correlation is achieved.

The pixel position of maximum cross-correlation provides a measure for the linear displacement of the speckles in the Fourier plane or in the image plane, respectively, i.e. a linear displacement which is proportional to the applied angular displacement, whereby this angular displacement of the object can be determined.

Object Surfaces

Generally, speckles arise when diffusely scattered electromagnetic radiation, e.g. scattered light from a surface having irregularities smaller than the wavelength of the incident radiation, interferes with each other or with electromagnetic radiation scattered from macrostructures in the surface, e.g. light scattered from irregularities larger than the wavelength of the incident radiation. The generated field is either Fourier-transformed into a speckle pattern in the Fourier plane, or the object is imaged into an imaged speckle pattern in the image plane, or both.

In a preferred embodiment, surfaces having a major proportion of diffusely scattered light can be applied.

If the object surface does not exhibit a suitable modulation of the detected speckles, the surface may be treated by methods known in the art.

Preferred treatments of the object surface comprise mounting retroreflective tape, sandblasting the surface, matting the surface.

Other Aspects of the Invention

According to another aspect of the invention, there is provided a method of determining twist of a rotating object, e.g. a shaft, between two or more parts of the rotating object subjected to a load. The twist can be calculated from the determined relative shift in angular displacements ($\theta_1/\theta_2$) and their mutual distance $d_{12}$ at two or more positions on the object using the formula: twist=$(\theta_1-\theta_2)/d_{12}$ (deg/m).

This method is advantageous since it is a non-contact method, independent on distance to the object, any longitudinal or transversal movements of the object, the shape of the object, and the radius of rotation. Further the calibration is independent on the wavelength of the source.

According to still another aspect of the invention, there is provided a method of simultaneously determining angular displacement and surface translation of one or more parts of an object.

This method is advantageous since it is a non-contact method.

According to still another aspect of the invention, there is provided a method of determining the radius of angular displacement of one or more parts of an object.

This method is advantageous since it is a non-contact method.

3. BRIEF DESCRIPTION OF THE DRAWINGS

In the following, the invention is further disclosed with detailed description of preferred embodiments, reference being made to the drawings in which FIGS. 1A–1D show cross-sectional sketches of preferred embodiments of carrying out directing the at least one beam of substantially coherent and substantially parallel electromagnetic radiation towards said one or more parts of an object;

Figure 5A:
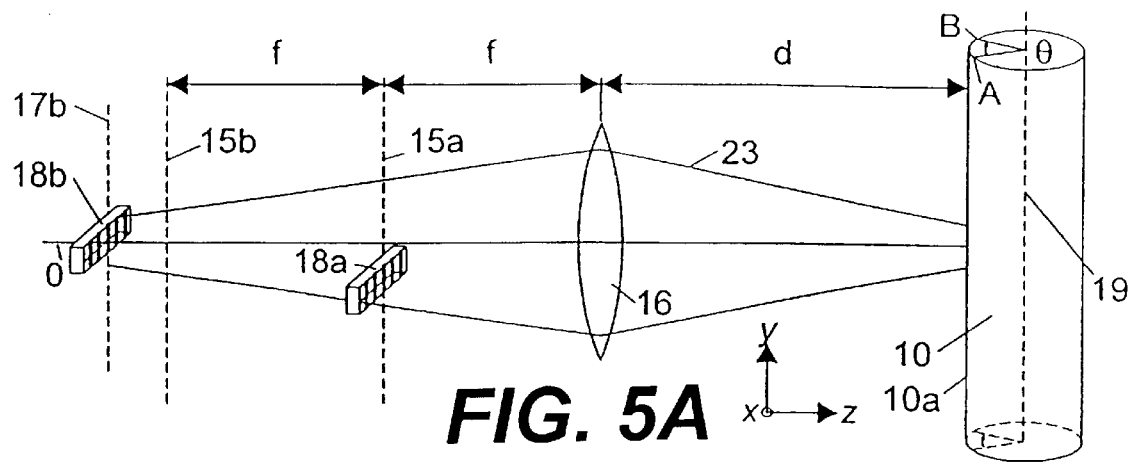
Figure 5B:
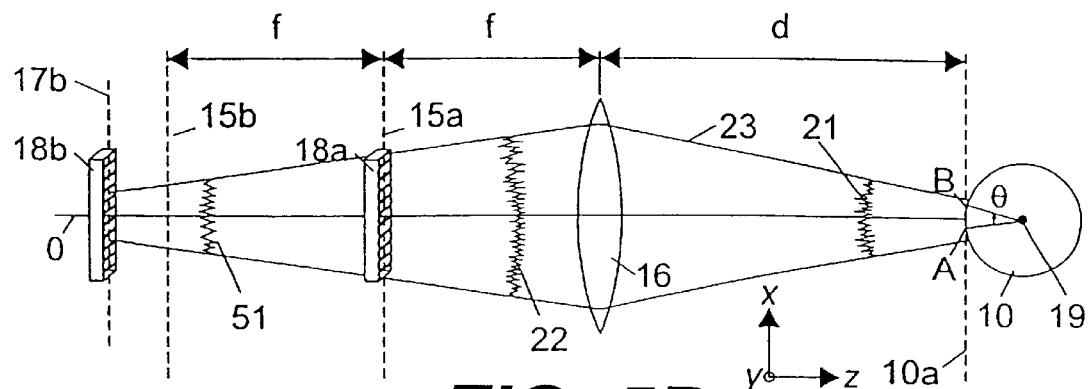
Figures 6A, 6B:
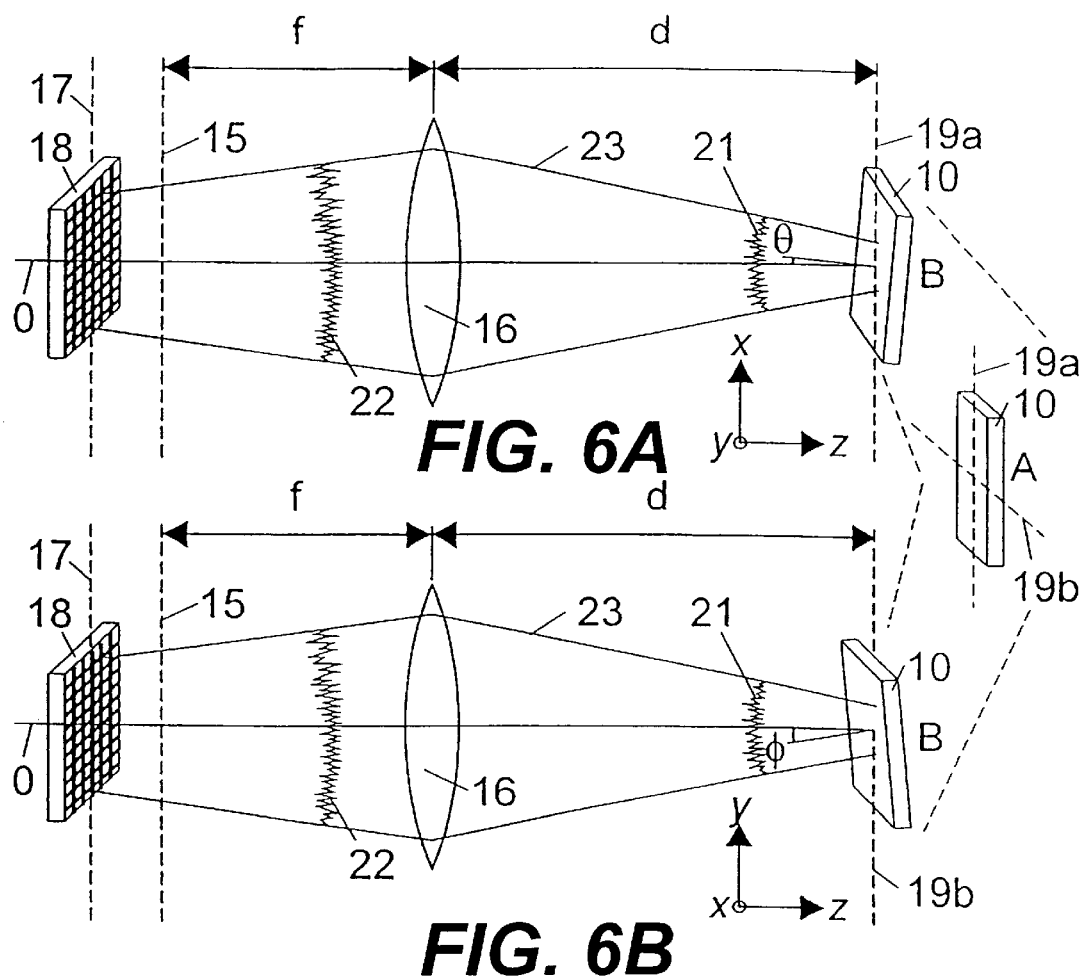
Figure 7A:
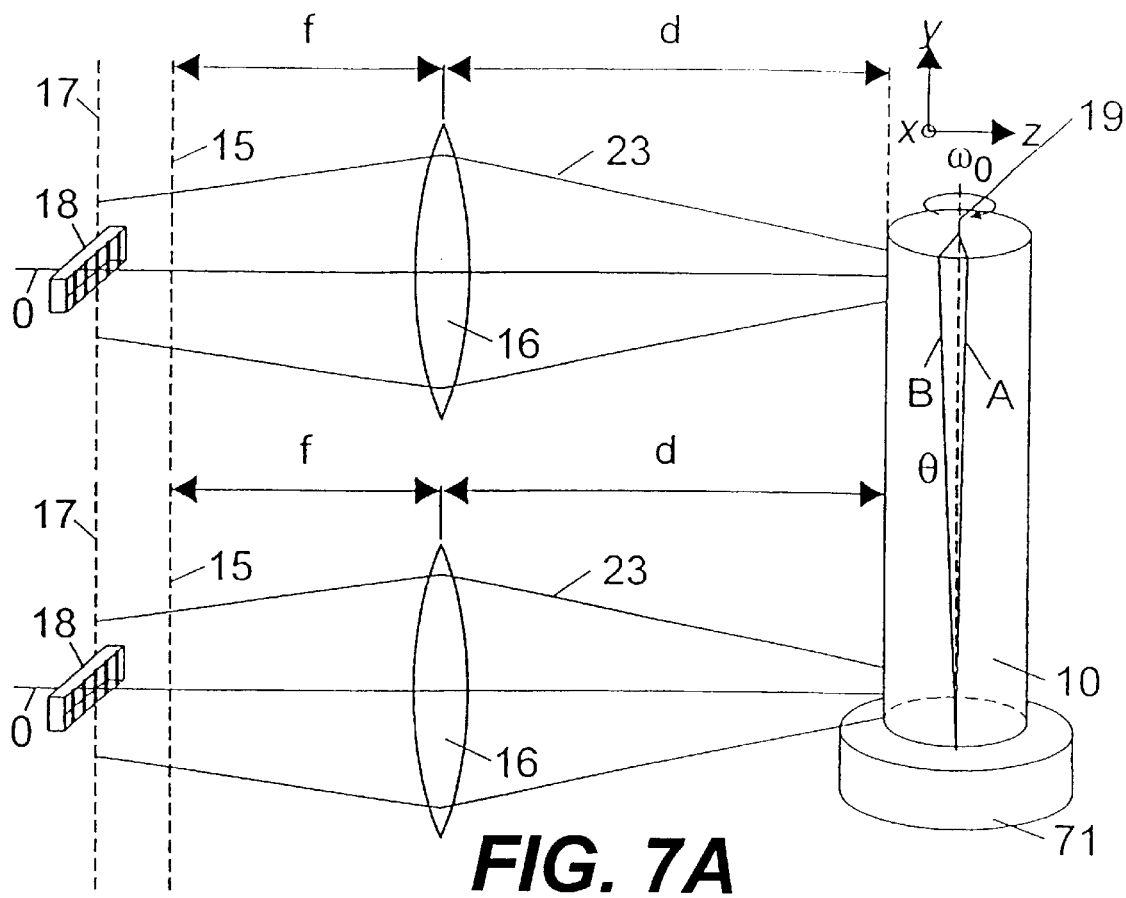
Figure 7B:
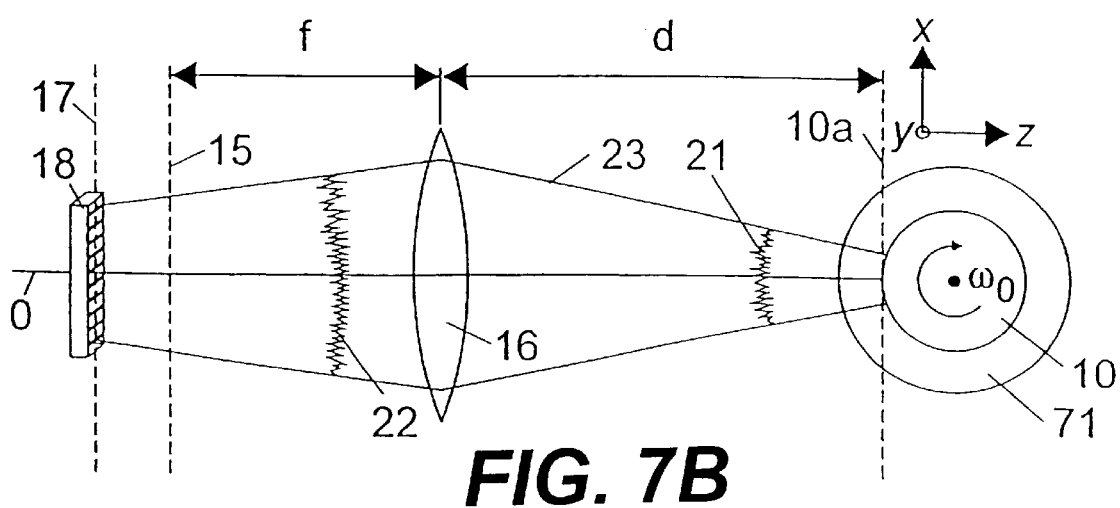
Figure 8A:
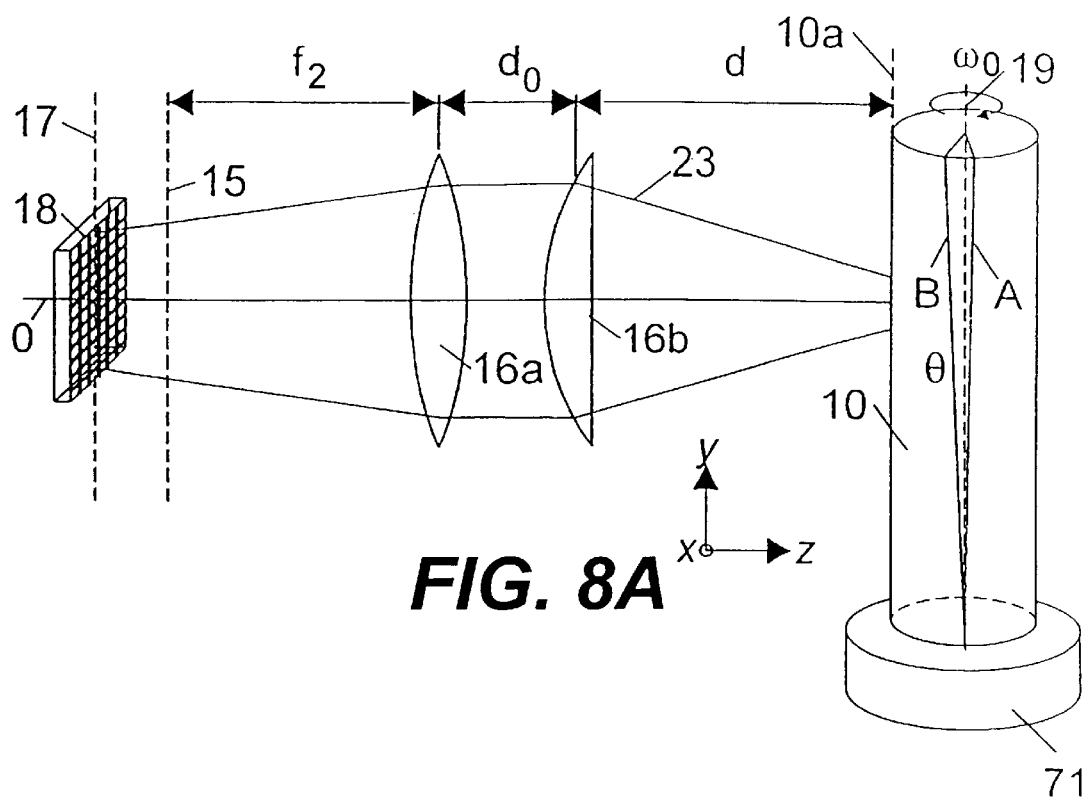
Figure 8B:
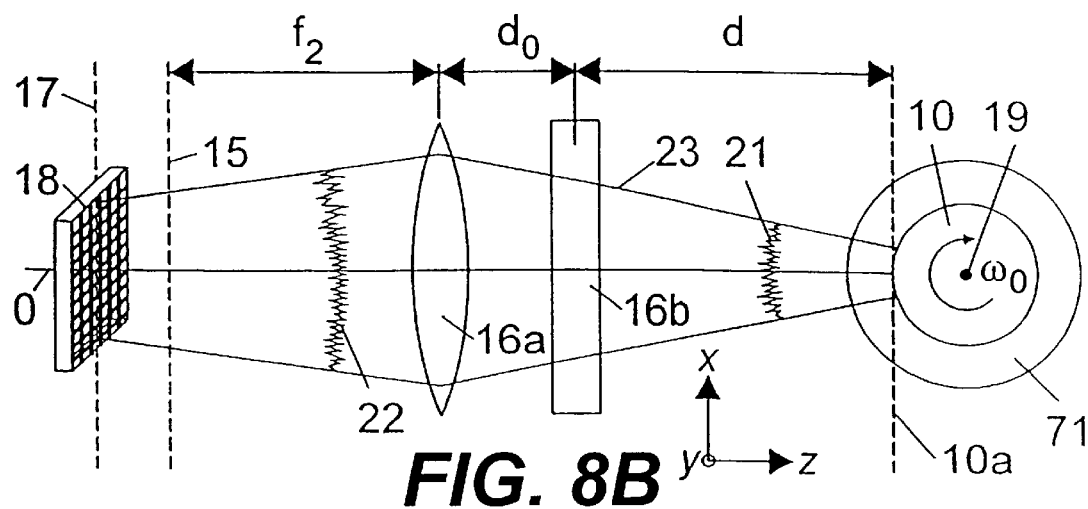
Figure 9A:
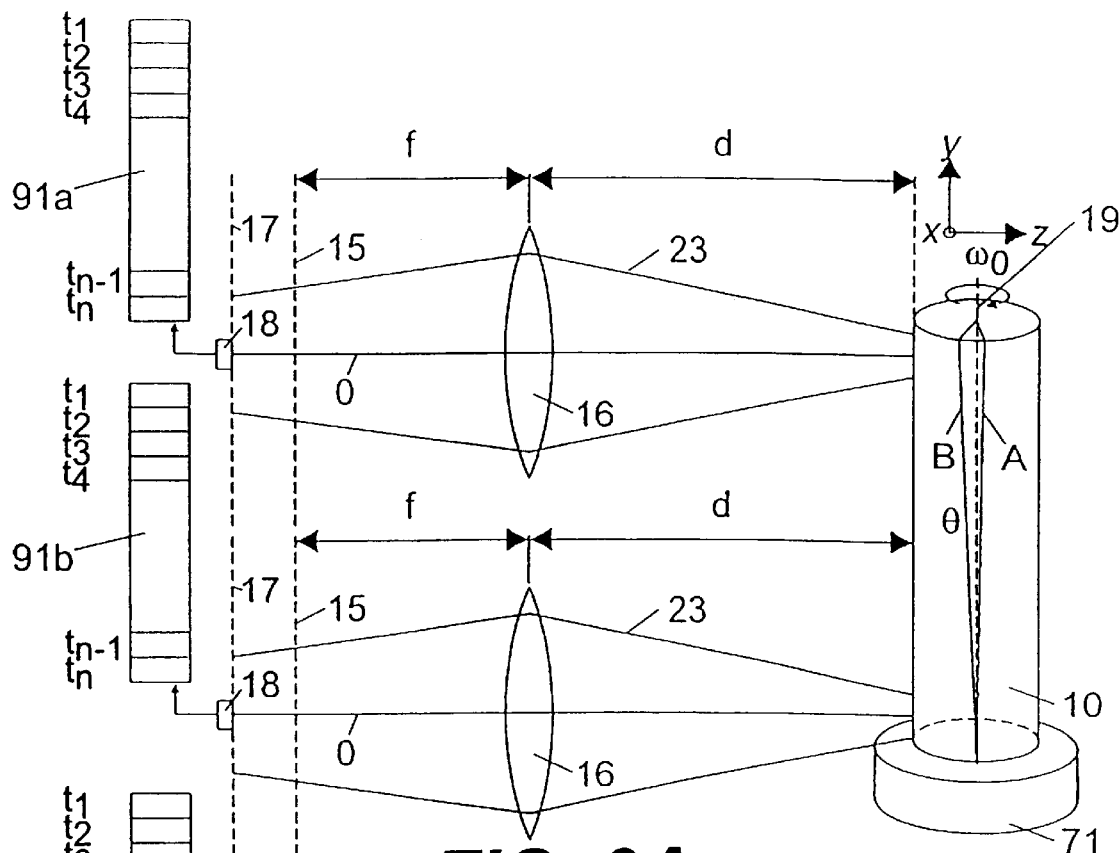
Figure 9B:
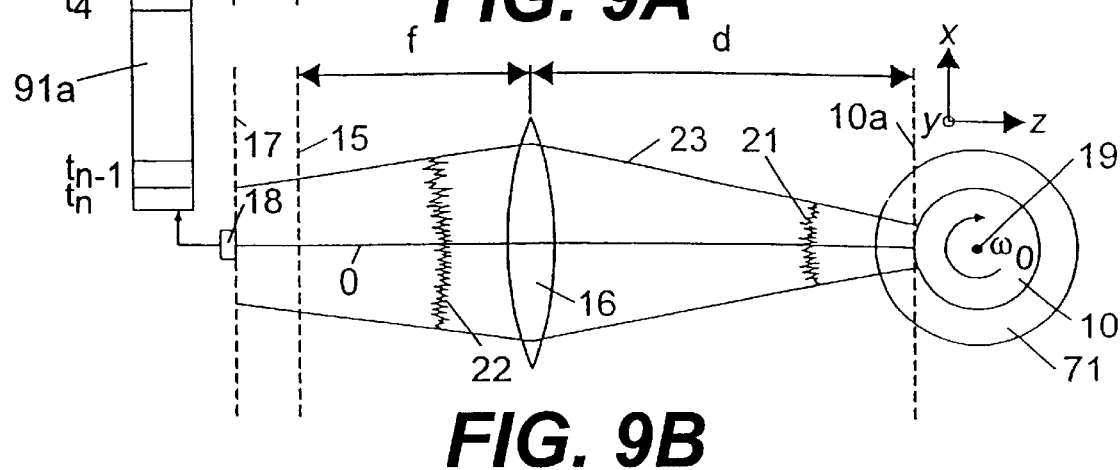
Figure 10:
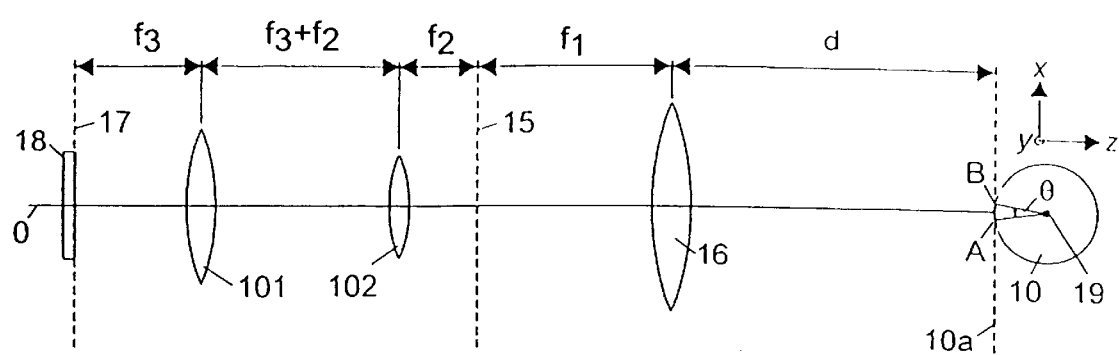
Figure 11:
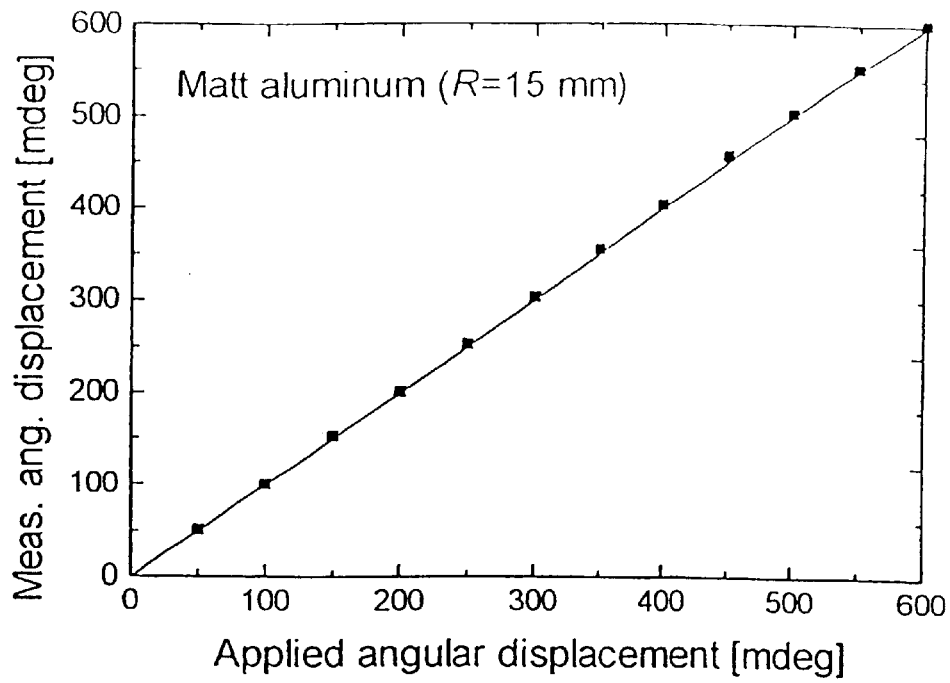
Figure 12:
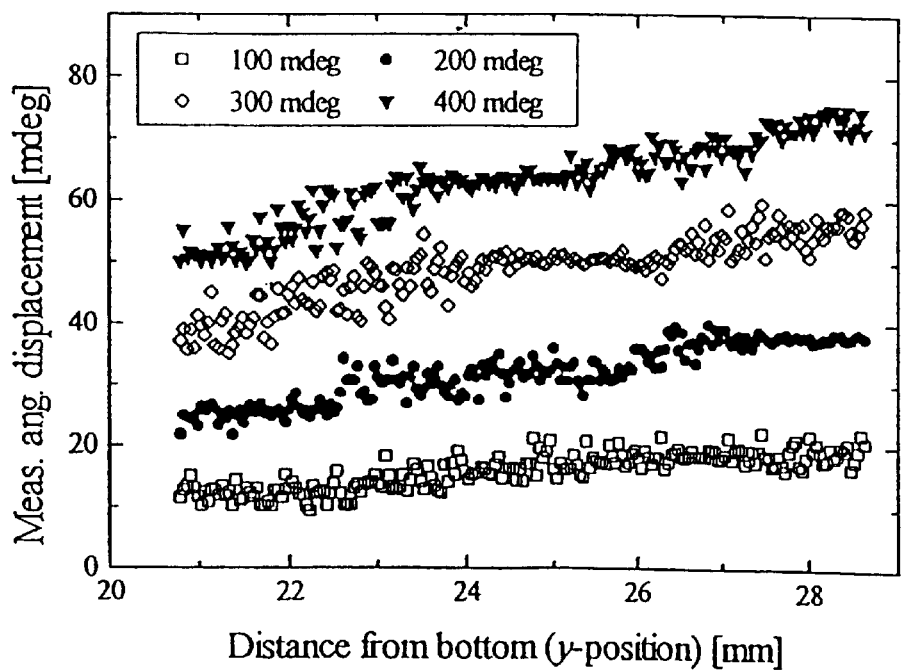

FIGS. 5A and 5B show longitudinal and cross-sectional sketches of a preferred embodiment of carrying out detecting said first and second one or more distributions of the Fourier-transformed speckles, and detecting first and second one or more distributions of imaged speckles for measuring angular displacement and surface translation and determination of the radius of displacement with respect to the displacement axis;

FIGS. 6A and 6B show other cross-sectional sketches of a preferred embodiment of carrying out detecting said first and second one or more distributions of Fourier-transformed speckles for measuring two-dimensional tilt of an object;

FIGS. 7A and 7B show longitudinal and cross-sectional sketches of a preferred embodiment of carrying out detecting said first and second one or more distributions of the Fourier-transformed speckles from two far spaced parts of the object for measuring twist thereof;

FIGS. 8A and 8B show longitudinal and cross-sectional sketches of a pre erred embodiment of carrying out detecting said first and second one or more distributions of the Fourier-transformed speckles from two closely spaced parts of the object for dynamically measuring the distribution of angular displacements thereof;

FIGS. 9A and 9B show longitudinal and cross-sectional sketches of a preferred embodiment similar to those shown in FIGS. 7 and 8, except for the image sensor being of a one-element detector with a shift register or a means for storing the temporal behaviour of the detector signal in a memory array;

FIG. 10 shows a cross-sectional sketch of a preferred embodiment of the Fourier-transforming means which comprises telescopic means to magnify or reduce the Fourier plane;

FIG. 11 shows a plot of measured angular displacement of a matt aluminium cylinder versus applied angular displacement; and FIG. 12 shows plots of measured angular displacements versus various heights close to the bottom of a twisted matt steel plate for applied angular displacements at its top.

4. DETAILED DESCRIPTION

Irradiation of the Object

In the following illustrations in FIG. 1A–1D the source of electromagnetic radiation is a laser source.

Figure 1A:
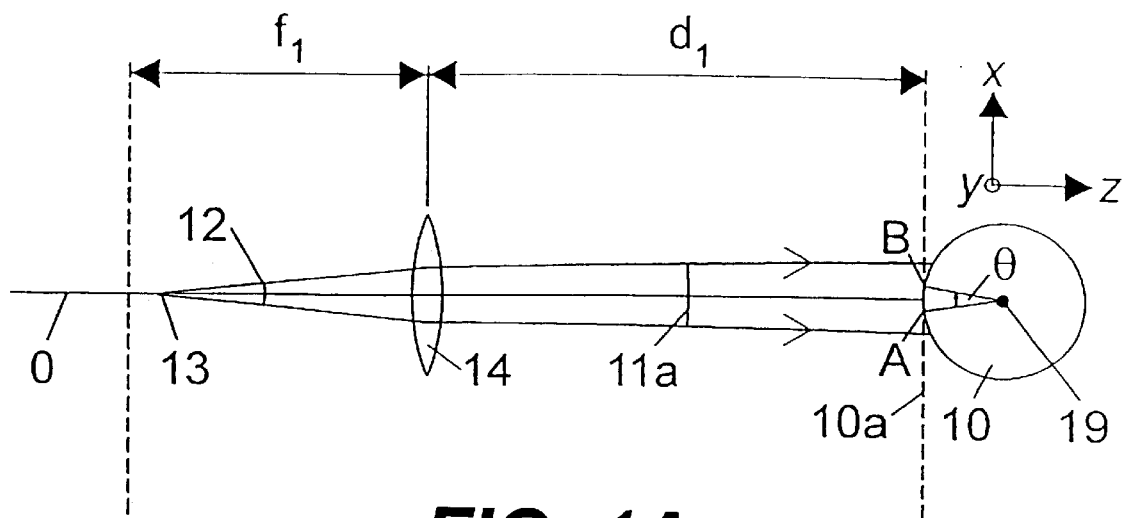

FIG. 1A shows a cross-sectional sketch of a preferred embodiment for carrying out directing the at least one beam of substantially coherent and substantially parallel electromagnetic radiation towards said one or more parts of the object positioned in a first or in a second position.

The irradiating beam may be either divergent or parallel irrespectively of the image sensor and the Fourier-transforming means. Further, the irradiating beam can be propagating inside or outside the Fourier-transforming means.

In this example, a slightly divergent beam of light $11a$ is directed towards a part of a cylinder 10 before and after the cylinder is angularly displaced clockwise between two positions A and B about an axis of displacement 19 perpendicular to the optical axis O.

The divergent beam $11a$ is provided by converging a spherical wave 12 of coherent light from a laser point source 13, positioned within the focal distance $f_1$ of the beam forming lens 14. If the point source is positioned outside the focal distance, the beam will be convergent. The light source 13 can be operated either in a pulsed mode or it can be run continuously.

In this example, the beam forming lens 14 is positioned in a distance $d_1$ to the object plane $10a$. However, the distance from the beam forming lens 14 to the object plane $10a$ can be chosen arbitrarily.

In another embodiment (not illustrated), the beam forming lens 14 collimates the spherical wave 12 into a parallel beam; said point source being placed in the focal point of the lens 14.

The beam forming lens 14 can be any suitable lens or lens system. It can be chosen by a skilled person depending on the preferred parameters of the beam for a specific application.

Figure 1B:
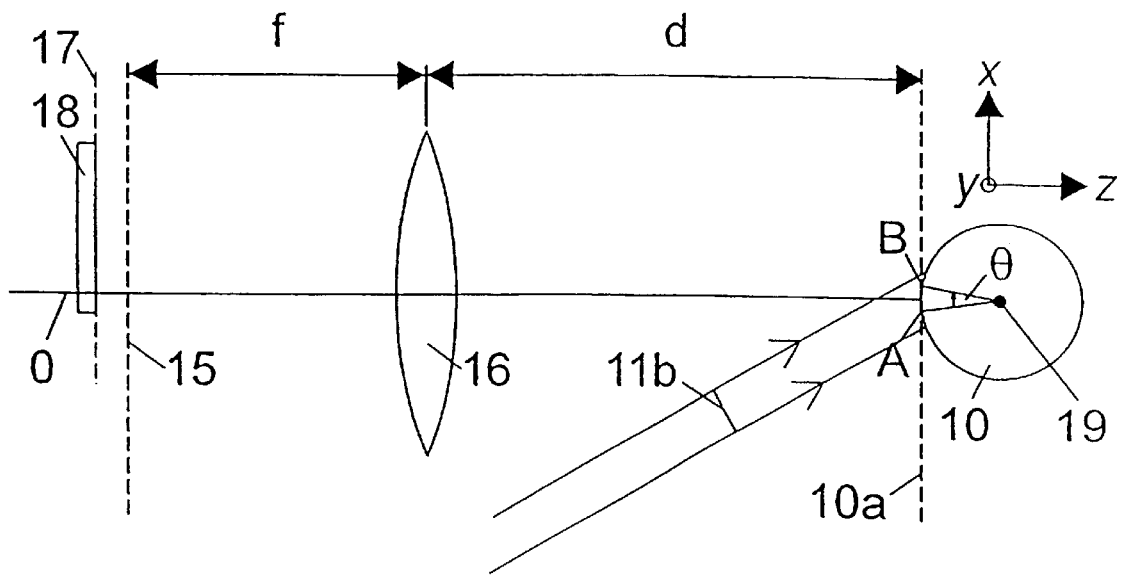

FIG. 1B shows another embodiment of carrying out directing the at least one beam of substantially coherent and substantially parallel beam of electromagnetic radiation $11b$ (source not shown) towards said one or more parts of the object 10. In this example, a beam of electromagnetic radiation $11b$, which can be provided as described in connection with FIG. 1A, is propagating outside of the Fourier-transforming means 16. For illustration in this embodiment, the detector plane 17 of the image sensor 18 is positioned asymmetrically with respect to the optical axis O near the Fourier plane 15 of the Fourier-transforming means 16.

Figure 1C:
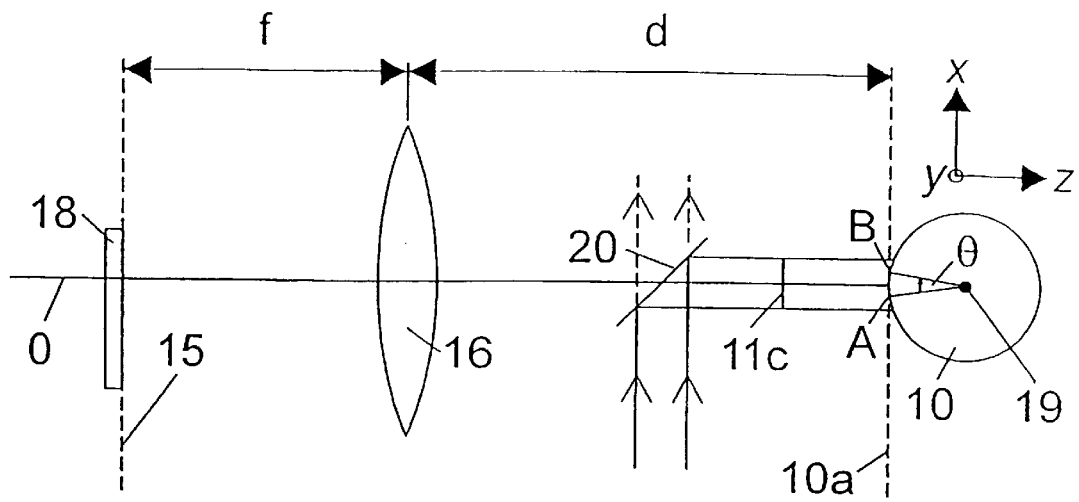

FIG. 1C shows still another embodiment of carrying out directing the at least one beam of substantially coherent and substantially parallel beam of electromagnetic radiation $11c$ (source not shown) towards said one or more parts of the objet 10. A semi-transparent mirror 20, or an ordinary mirror, directs a substantially parallel and substantially coherent beam of electromagnetic radiation 11c towards said one or more parts of object 10, so that said beam of electromagnetic radiation is centered around the optical axis 0 of the Fourier-transforming means 16. For illustration in this embodiment, the detector plane of the image sensor 18 coincides with the Fourier plane 15 of the Fourier transforming means 16.

Figure 1D:
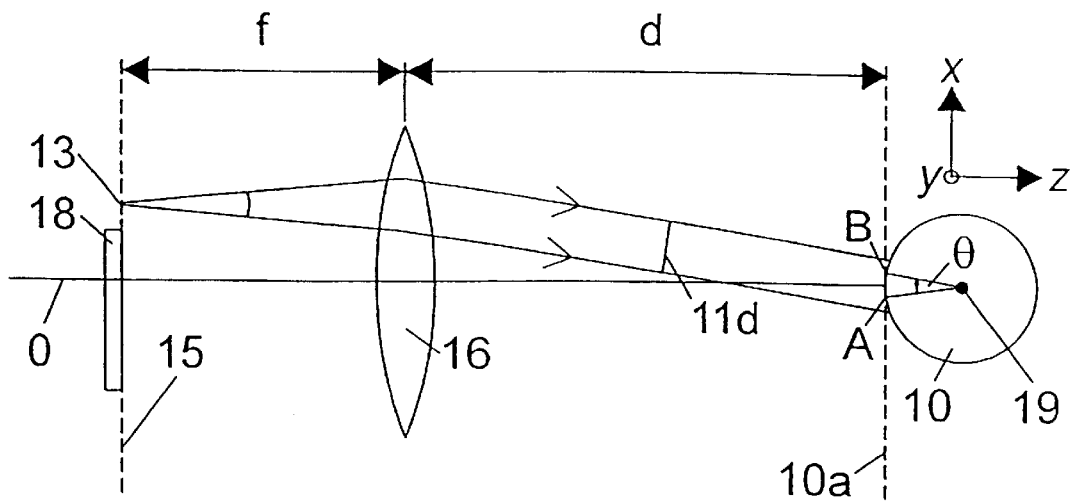

FIG. 1D shows still another embodiment of carrying out directing the at least one beam of substantially coherent and substantially parallel beam of electromagnetic radiation 11d (source not shown) towards said one or more parts of the object 10. The source of electromagnetic radiation 13 is placed off-axis to the optical axis O in the Fourier plane 15, i.e. it is placed transversely to the optical axis O, e.g. to provide space for an image sensor 18 having a detector plane which coincide with the Fourier plane 15 of the Fourier-transforming means 16. The image sensor 18 is being close to or centered asymmetrically about the optical axis. The Fourier-transforming lens 16 is used to provide a substantially parallel and substantially coherent beam of electromagnetic radiation 11d which is directed towards one or more parts of the object 10 inside the aperture of a Fourier transforming means 16. The source or electromagnetic radiation 13 can be placed arbitrarily in the Fourier plane 15.

Detection of Distributions of Speckles (a) One-dimensional Angular Displacement

Figure 2:
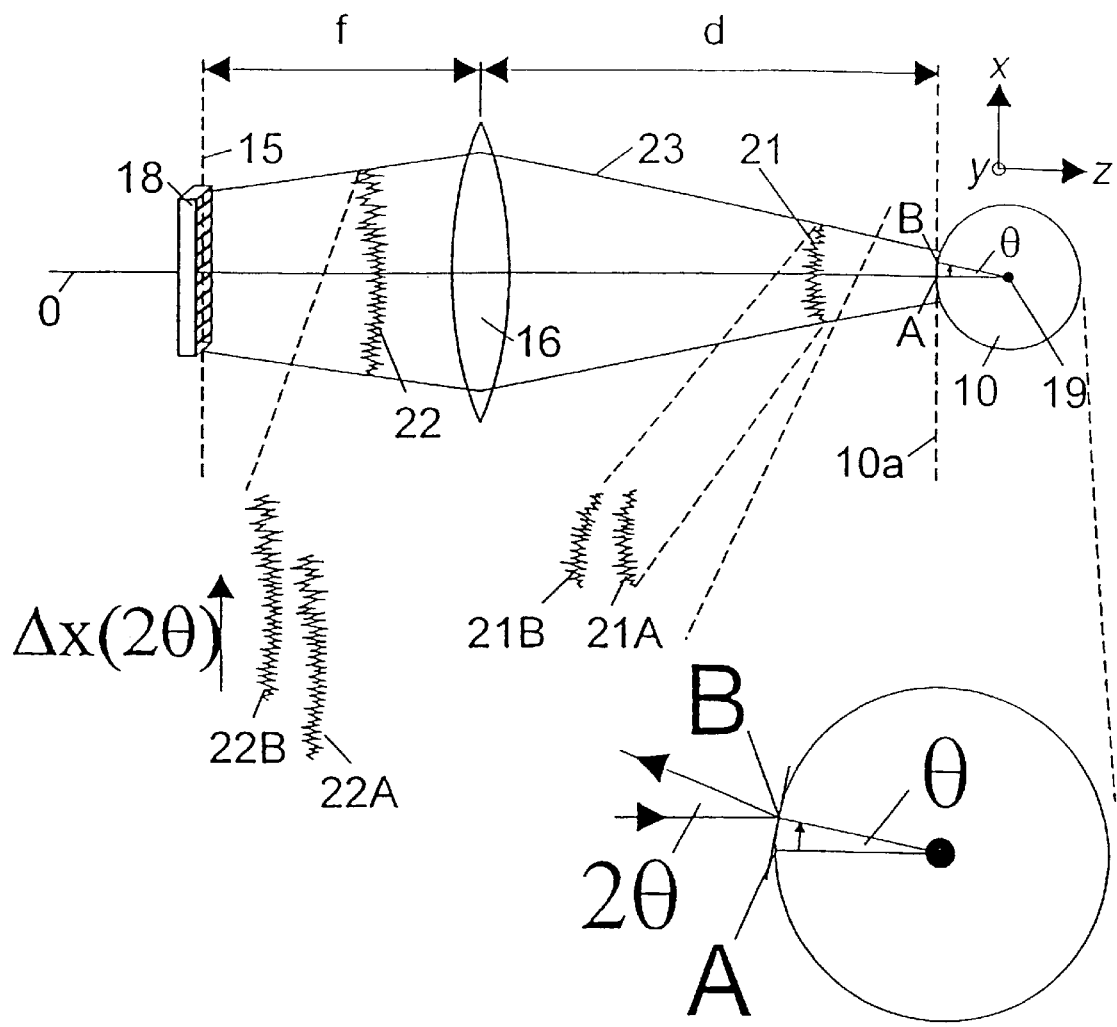
FIG. 2 shows a cross-sectional sketch of a preferred embodiment of carrying out detecting in at least one first image sensor first and second one or more distributions of the Fourier-transformed speckles provided by at least a part of the electromagnetic radiation scattered from said one or more parts of the object in said first and second positions.

FIG. 2 shows a cross-sectional sketch of a preferred embodiment for carrying out the detection of said at least a part of the electromagnetic radiation scattered from said one or more parts of the object in said first and second positions.

In this example, irradiation of only one part of the object is assumed. A substantially parallel and substantially coherent beam of light (11a, 11b, 11c, 11d) irradiates a selected part of the cylinder 10 similar to the beams (11a, 11b, 11c, 11d) as shown in FIGS. 1A–1D.

It should be noted that other parts of the object could be irradiated in parallel, as illustrated in later examples, in order to simultaneously determine angular displacements of these other parts of the object.

Further, the object is angularly displaced in one dimension only. In this example the object 10 is angularly displaced the angle θ with respect to the displacement axis 19. An example illustrating angular displacement in two dimensions is provided below.

In the blown up part of FIG. 2, there are shown two positions A and B of the object, i.e. the positions before and after the angular displacement of the object, respectively. The irradiated part of the object is angularly displaced the angle θ from the position A to the second position B about the displacement axis 19 in a clockwise direction as indicated by the arrow. In this position B, at least a part of the electromagnetic radiation scattered from this part of the object is reflected in a reflection 21B in an angle 20 with respect to the reflection 21A in position A.

In the detector plane coinciding exactly with the Fourier plane 15, an angular displacement of the Fourier-transformed reflections is mapped into a linear displacement Δx(2θ) on the image sensor 18. Thus, the first detected intensity distribution of speckles 22A in position A is linearly displaced into the second intensity distribution of speckles 22B in position B.

Each surface element of the irradiated surface of the object 10 provides a spherically scattered reflection that is diffusely and/or specularly scattered therefrom. Those reflections 21A, 21B that falls within the aperture boundaries 23 of the Fourier-transforming means, in this example a lens 16, will be the Fourier transforming means.

First and second one or more distributions of speckles are detected in at least one image sensor, i.e. the Fourier-transformed wave patterns before and after angular displacement are detected in said at least one image sensor as distributions of speckles, viz. constructive and destructive interferences of said Fourier-transformed components of the reflection. In this example, the first 22A and second 22B Fourier-transformed wave patterns provide distributions of speckles before and after the angular displacement of the object, respectively, which are detected in the image sensor; said image sensor being positioned exactly in the Fourier plane 15 of the lens 16. The exact position of the image sensor is not essential as long as it is positioned in or near the Fourier plane.

In this example, the image sensor is a one-dimensional array detector of 512 pixels, RL0512G supplied from EG&G RETICON, USA.

In order to maintain a good precision for large angular displacements, it is preferred to measure the angular displacement in sections using each preceding section as reference for the succeeding section. In yet another preferred embodiment, the reference speckle patterns, said first positions are pre-recorded at known fixpoints and stored in a memory array. After the applied angular displacement of the object, the current speckle pattern, said second position, is recorded and the displacement relative to the fixpoints is calculated. This method is in particular advantageous for absolute rotation encoder applications.

A measure for the size of the section can be obtained from the peak value of the cross-correlation. When the peak value drops to a value below a given threshold (80%), the reference signal is replaced by the present one and the speckle displacement is added up. (See e.g. M. Sjödahl and I. Yamaguchi, "Strain and Torque Measurements on Cylindrical Objects Using the Laser Speckle Strain Gauge", Optical Engineering, Vol. 35, p. 1179–1186, 1996).

An illustration of the determination of angular displacement of 0–600 mdeg is shown in Example 1.

Figure 3:
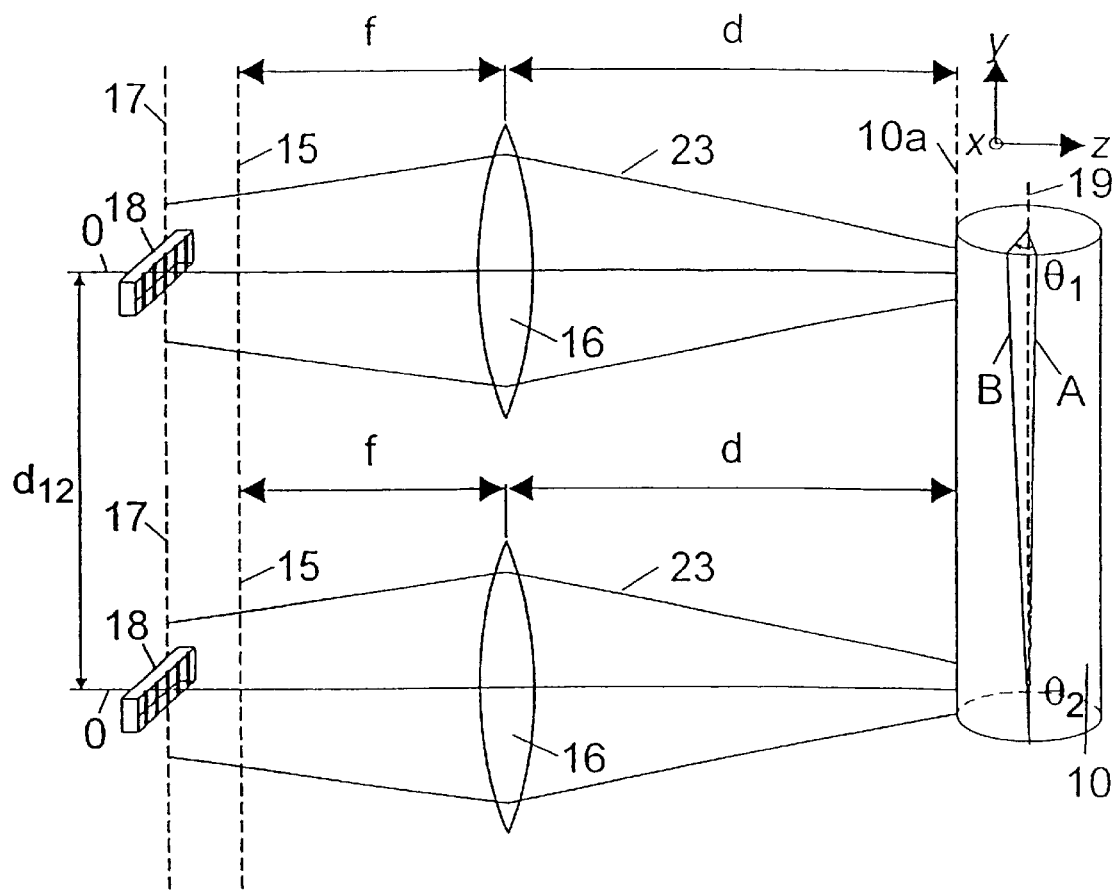
FIG. 3 shows a longitudinal, cross-sectional sketch of a prefer embodiment of carrying out detecting said first and second one or more distributions of the Fourier-transformed speckles from two far spaced parts of the object.

(b) Two one-dimensional Angular Displacements of Far Spaced Parts of the Object Using Two One-dimensional Array Detectors FIG. 3 shows another cross-sectional sketch of a preferred embodiment for carrying out detecting said first and second one or more distributions of the Fourier-transformed speckles from two far-spaced parts of the object.

In this example, irradiation and detection of two far-spaced parts of the object is assumed. Two substantially parallel and substantially coherent beams of light irradiate the two selected part of the cylinder 10 separated along the longitudinal axis of the object, in analogy to the one part irradiation 11a, 11b, 11c, 11d of the object as shown in FIGS. 1A–1D.

The angular displacements of the two parts of the object are determined as illustrated for the embodiment shown in FIG. 2.

It should be noted that the two irradiation and detection configurations can be equal or different.

The two angular displacements can be used to determine the twist of the object provided the distance between the two parts of the object is known.

Figure 4A:
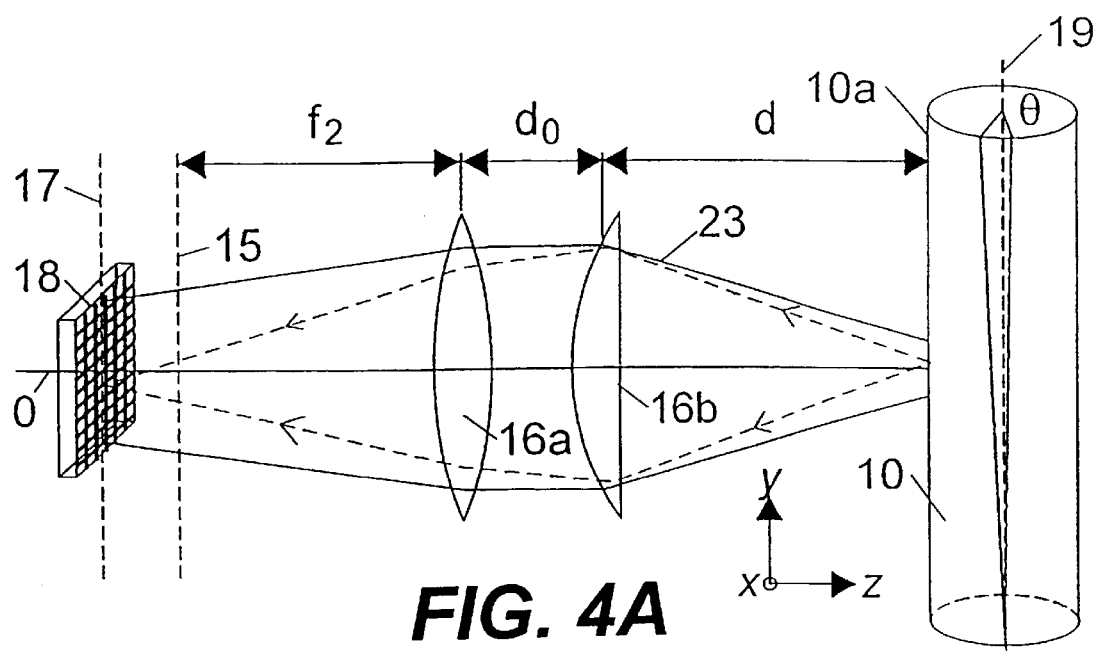
FIGS. 4A and 4B show longitudinal and cross-sectional sketches of a preferred embodiment of carrying out detecting said first and second one or more distributions of Fourier-transformed speckles from more closely spaced parts of the object.
Figure 4B:
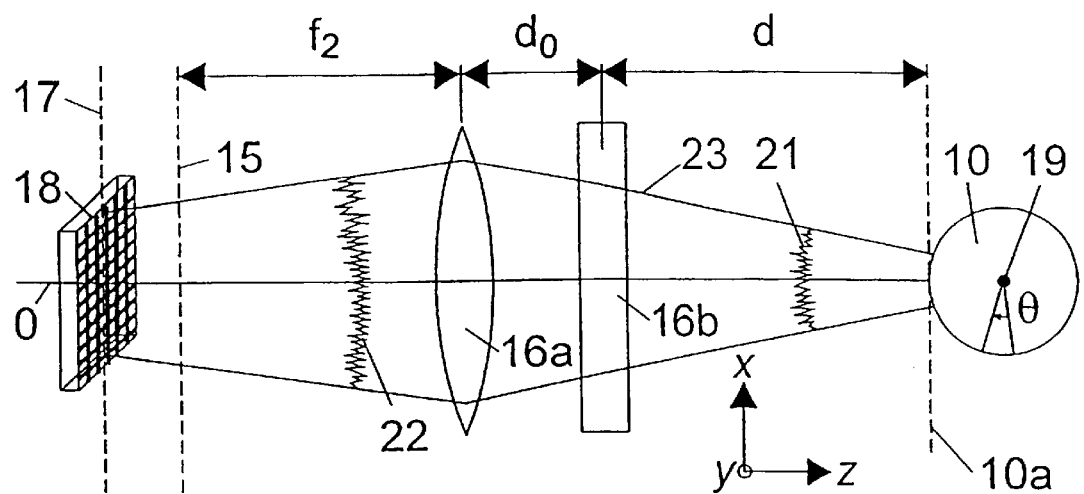

(c) More One-dimensional Angular Displacements of Closely Spaced Parts of the Object Using One Two-dimensional Array Detector FIGS. 4A and 4B show cross-sectional sketches of a preferred embodiment for carrying out detecting said first and second one or more distributions of Fourier-transformed speckles from more closely spaced parts of the object.

This example illustrates an embodiment that extends the determination of the two one-dimensional angular displacements of two far spaced parts of an object as shown in FIG. 3 to the determination of more one-dimensional angular displacements of more closely spaced parts of the object.

The Fourier-transforming means additionally comprises a. cylindrical lens 16*b* inserted between the object 10 and the Fourier-transforming lens 16*a* in order to perform the necessary imaging along the axis of the shaft.

The object 10 can be placed arbitrarily, but it is preferably placed in or near the focal plane of the cylindrical lens.

The cylindrical lens 16*b* performs imaging in the y-direction whereby surface elements on the irradiated part of the object having different heights are imaged on corresponding heights of the image sensor 18, here a two-dimensional array detector placed in or near the Fourier plane of the Fourier-transforming lens 16*a*.

The distance between the cylindrical lens 16*b* and the Fourier-transforming lens 16*a* can be chosen arbitrarily.

The distribution of angular displacements versus y-position of the part of the object irradiated can be determined as the distances between the surface elements of the object, corresponding to the y-lines in the two-dimensional array detector, are known from the geometrical magnification in the y-direction given by methods known in the art, see e.g. A. E. Siegman, "Lasers", University Science Books, USA, 1986.

(d) One-dimensional Angular Displacement and Surface Translation

FIG. 5 shows a cross-sectional sketch of a preferred embodiment for carrying out the detection of said at least a part of the electromagnetic radiation scattered from said one or more parts of the object in said first and second positions in which the surface translation is additionally determined.

This embodiment is similar to the embodiment shown in FIG. 2, except that surface translation is additionally detected by a second image sensor 18*b* placed in or near the image plane 15*b* of the object 10, and except that the first image sensor 18*a* detecting the Fourier-transformed speckles is placed in the Fourier plane. If the second image sensor 18*b* is placed outside the Fourier plane 15*a*, preferably in or near the image plane 15*b* positioned 2*f* from the Fourier-transforming lens 16, then the translation of the surface originating from the angular displacement of the object 10 towards a linear displacement of the distribution of speckles detected therein. By determining the angular displacement and the corresponding surface translation of the object 10, in both image sensors 18*a* and 18*b*, respectively, based on cross-correlation of their displaced distributions of speckles, the radius of angular displacement is determined by methods known in the art. The measurements or the surface translation is dependent on the angular displacement (provided by the image sensor placed exactly in the Fourier plane), target distance d the distance from the Fourier lens 16 to the image sensor placed in or near the image plane, and the radius of angular displacement.

(e) Two-dimensional Angular Displacement

FIGS. 6A and 6B show cross-sectional sketches of a preferred embodiment for carrying out detecting said first and second one or more distributions of Fourier-transformed speckles for measuring two-dimensional tilt of an object.

In this example, irradiation of only one part of the object, here exemplified by a plate, is illustrated.

It is assumed that a substantially parallel and substantially coherent beam of light irradiates a selected part of the plate 10 similar to the beams of light 11*a*, 11*b*, 11*c*, 11*d* as shown in FIGS. 1A–1D.

The object is angularly displaced in two dimensions; in this example the object 10 is angularly displaced the angle θ with respect to the displacement axis 19*a*, and angularly displaced the angle φ with respect to the displacement axis 19*b*.

This preferred embodiment is similar to the embodiment shown in FIG. 2, except for the image sensor 18 which is a two dimensional array detector of a standard type ccd camera without a lens, e.g. TI-22 CCD camera from NEC, Japan.

From the position A, the plate 10 is angularly displaced the angle θ in the x-direction, and the angle φ in the y-direction, whereby a surface element moves to position B. In total, an angular displacement of θ,φ degrees of the target provides a rotation of 2θ,2φ degrees of the reflection.

The displacement 2θ,2φ of the reflection is mapped into a linear displacement in the xy-plane on the image sensor 18 placed in or near the Fourier plane.

The two-dimensional displacement can be determined with the same advantages as those described for the one-dimensional displacement in connection with FIG. 2.

In particular, the two-dimensional array detector provides the advantages of a very compact image sensor compared to the alternative of two one-dimensional array detectors. In particular cases, however, the two-dimensional array detector can be substituted by two one-dimensional array detectors.

(f) Twist of a Totating Shaft Subjected to a Load

FIGS. 7A and 7B show longitudinal and cross-sectional sketches of a preferred embodiment of carrying out detecting said first and second one or more distributions of the Fourier-transformed speckles from two far spaced parts of the object for measuring the relative shift in angular displacements thereof. The relative shift in the two angular displacements can be used to determine the twist of the object provided the distance between the two parts of the object is known.

In this example, a high power pulsed laser, e.g. SDL-2100-E1 from SDL, USA, irradiates in a strobed mode a cylinder similar to that shown in FIG. 3.

In at least one first image sensor 18 first one or more distributions of Fourier-transformed speckles from two far-spaced parts of a cylinder 10 are detected before and after a load 71 is applied to the cylinder. The strobed laser pulse before and after loading the object should preferably be positioned at approximately the same overall angular position of the shaft. A slight change in the timing between the angular position of the strobe pulses can be compensated for in the subsequent data analysis.

(g) Dynamic Relative Shift in Angular Displacements of a Rotating Shaft Subjected to a Load FIGS. 8A and 8B show longitudinal and cross-sectional sketches of a preferred embodiment of carrying out detecting said first and second one or more distributions of the Fourier-transformed speckles from two or more closely spaced parts of the object for dynamically measuring the relative shift in angular displacements thereof.

In this example irradiation of the object is performed as for FIGS. 7A and 7B.

However, instead of measuring the relative shift in angular displacements between far spaced parts of the rotating shaft as in FIGS. 7A and 7B, the distribution of relative shift in angular displacements between closely spaced parts of the rotating shaft, similar to that in FIGS. 4A and 4B, are determined. Further, as for the embodiment shown in FIGS.

7A and 7B a slight change in the timing between the angular position of the strobe pulses can be compensated for in the subsequent data analysis. The axial distribution of angular displacements can thus be probed revealing the twist of the shaft.

(h) Twist of a Rotating Shaft Subjected to a Load Using a One-element Detector with Shift Register FIGS. 9A and 9B show longitudinal and cross-sectional sketches of a preferred embodiment similar to those shown in FIGS. 7 and 8, except for the image sensor being of a one-element detector with a shift register.

In this example irradiation of the object is performed as for either FIG. 3 or FIGS. 7A or 7B.

However, instead of using an array detector, one or more one-element detectors 18 with shift registers 91 distributed along the shaft axis are used.

This embodiment of the image sensor has the advantage of being extremely fast compared to one- and two-dimensional array detectors.

Storing of the temporal information in the shift register of the signal can be performed in a digital storage memory in an oscilloscope or in a digital computer after digitizing the analogue detector signal.

Determination of Angular Displacement

The linear displacements $\Delta x, \Delta y$ between the first and second distributions of speckles, both Fourier/-transformed speckles and imaged speckles, are determined by cross-correlating the detected images thereof as a function of the angular displacements $\theta, \phi$ of said one or more parts of the object.

Cross-correlation of the detected images, e.g. recorded signals from the image sensor 18 before and after angular displacement of the irradiated part of the object, are obtained by methods known in the art.

In the examples, the displacement between the first 22a and second 22b distributions of the Fourier-transformed speckles, and the first and second distributions of recorded speckles 51, are determined by calculating the position for maximum cross correlation between the two signals from the image sensor using an algorithm disclosed in M. Sjodahl, ibid.

The position for maximum cross-correlation is calibrated against known angular displacements provided by a rotation stage from Klinger Scientific (DCS750) with a stated resolution of 1 mdeg.

Fourier-Transforming Means

The at least a part of the electromagnetic radiation scattered from said one or more parts of the object is Fourier transformed by at least one Fourier-transforming means having a Fourier plane. In the examples, the Fourier-transforming means is illustrated by a converging lens 16.

In FIG. 10 a preferred embodiment is shown in which a telescopic set of lenses 101, 102 depicts the Fourier plane 15 to the detector plane 17 of the image sensor 18.

Configurations of Light Source and Detection Region

Generally, the position of the image sensor 18 in the detector plane 17 can be symmetrical or asymmetrical with respect to the intercept of the optical axis 0. In the example shown in FIG. 2, a symmetrical configuration is illustrated.

Object Surfaces

The object surface should be able to generate speckles.

In all the illustrated embodiments, the surfaces of the aluminium cylinders and steel plates have been sandblasted.

5. EXAMPLES

The invention is further illustrated by the following in examples.

Example 1

"Angular Displacement of a Matt Aluminium Cylinder"

An apparatus according to the one shown in FIG. 1C and FIG. 2 was provided with the exception that the image sensor 18, a linear array sensor RL0512-G from EG&G Reticon, placed exactly in the Fourier plane. The signals from the image sensor, before and after angular displacement of 0.6 degrees in total, of the object 10 a matt aluminium cylinder with a radius of 15 mm, were cross-correlated in a personal computer by calculating the empirical cross-correlation coefficient as described above, and the linear displacement of the speckles in the Fourier plane was determined by the method of M. Sjödahl.

FIG. 11 shows a typical set of measurements where the measured angular displacement is plotted versus the applied angular displacement of 0–600 mdeg for a matt aluminium cylinder with a radius of 15 mm. Similar measurements were obtained for matt aluminium cylinders having radius of 10 and 20 mm. The object distance, d, was 100 mm. Measurements with object distances of 90 and 110 mm showed similar results. The matt aluminium surface gave mainly rise to diffusely scattered light. The measurements were performed in steps of 50 mdeg, and the angular displacement was applied with a rotational stage from Klinger Scientific (DCS750) with a resolution of 1 mdeg. From FIG. 11 it can be seen that the measured angular displacements equal the applied angular displacements. The measured linear displacement $\Delta x$ is converted to angular displacement $\theta$, using the relation:

$$\Delta x = 2\theta f$$

Example 2

"Twist of a Matt Steel Plate"

An apparatus according to the one shown in FIG. 1C and FIG. 6 was provided with the exception that the image sensor 18, a two-dimensional image sensor TI-22 CCD Camera from NEC, Japan, placed exactly in the Fourier plane, and with the exception that the object was a matt steel plate. The signals from the individual lines on the image sensor, before and after angular displacement $\theta$ of the steel plate, were cross-correlated in a personal computer, and the displacement $\Delta x$ that provided maximum cross-correlation between the two signals from the image sensor was determined by the method of M. Sjödahl.

FIG. 12 shows a typical set of measurements where the measured angular displacement is plotted versus lateral position on the y-axis. The object was a 1 mm thick matt steel plate (48×180 mm). The target distance, d, was 200 mm. The matt steel surface gave mainly rise to diffusely scattered light. The plate was fixed at the bottom position and twisted from the top with a rotational stage from Klinger Scientific (DCS750). Measurements for different twist sites at the top of the plate, corresponding to different displacement axes, were obtained. FIG. 12 clearly shows that the sensor can be used to measure the distribution of angular displacement along a twist axis. We used the same relation as the one shown in example 1 to calculate the angular displacement. Again the measurements showed that the determination of angular displacement was insensitive to object distance and distance to the center of rotation.

What is claimed is:

1. A method for determining angular displacements of one or more parts of an object, said method comprising:
   a) directing at least one beam of substantially coherent and substantially parallel electromagnetic radiation towards said one or more parts of the object positioned in a first position;
   b) detecting in at least one first image sensor, a first one or more distributions of speckles provided by at least a part of the electromagnetic radiation scattered from said one or more parts of the object in said first position;
   c) angularly displacing said one or more parts of the object to a second position;
   d) detecting in said at least one first image sensor, a second one or more distributions of speckles provided by at least a part of the electromagnetic radiation scattered from said angularly displaced one or more parts of the object in said second position; and
   e) determining one or more displacements of the first and second detected distributions of the speckles as a function of the angular displacements of said one of more parts of the object between said first and second positions;
   wherein
   f) the at least a part of electromagnetic radiation scattered from said one or more parts of the object is Fourier transformed by at least one Fourier-transforming means having a Fourier plane, and
   g) the at least one first image sensor is positioned in a detector plane in or near said Fourier plane of said at least one Fourier-transforming means.

2. A method according to claim 1, wherein
   h) the first and second one or more distributions of speckles, provided by at least a part of the electromagnetic radiation scattered from said one or more parts of the object in said first and second positions, are detected in at least one second image sensor not positioned in or near the Fourier plane, and wherein
   g) one or more displacements of said first and second one or more distributions of speckles detected in the second image sensor are determined as a function of the angular displacements of said one or more parts of the object between said first and second positions.

3. A method according to claim 1 or 2, wherein the Fourier-transformed speckles provided by surface elements of one or more parts of the object having different positions along the axis of angular displacement are additionally imaged into corresponding positions of the first image sensor.

4. A method according to claim 3, wherein the Fourier-transformed and additionally imaged speckles are detected in the first image sensor in lines perpendicular to the axis of angular displacement.

5. A method according to claim 1, wherein the detection in the at least one first or second image sensors comprises simultaneous detection of one or more distributions of static speckles.

6. A method according to claim 1, wherein the detection in the at least one first or second image sensors comprises successive detection of one or more distributions of dynamic speckles.

7. A method according to claim 1, wherein the determination of displacements of the detected first and second one or more distributions of speckles are determined by the pixel position of maximum cross-correlation.

8. An apparatus for determining angular displacements of one or more parts of an object, said apparatus comprising:
   a) means for directing at least one beam of substantially coherent and substantially parallel electromagnetic radiation towards said one or more parts of the object;
   b) at least one first image sensor for detecting first and second one or more distributions of speckles provided by at least a part of the electromagnetic radiation scattered from said one or more parts of the object before and after they are being angularly displaced;
   c) means for determining displacements of the detected first and second one or more distributions of speckles as a function of the angular displacements of said one or more parts of the object;
   d) means for Fourier-transforming at least a part of the electromagnetic radiation scattered from said one or more parts of the object; said means having a Fourier plane in or near the plane of the detecting means of the first and second one or more distributions of speckles.

9. An apparatus according to claim 8, which additionally comprises at least one second image sensor, not positioned in or near the Fourier plane.

10. An apparatus according to claim 9, wherein the second image sensor is positioned near or in the image plane of the object.

11. An apparatus according to claim 8, which further comprises imaging means for imaging in one direction while maintaining Fourier-transformation in a direction perpendicular thereto.

12. An apparatus according to claim 11, wherein the imaging means is a cylindrical lens.

13. An apparatus according to claim 8, wherein the Fourier-transforming means comprises Fourier-transforming devices comprising refractive, reflective, and diffractive optical elements; and active liquid crystals.

14. An apparatus according to claim 13, wherein the Fourier-transforming refractive optical elements are selected from the group consisting of convex lenses and cylinder lenses.

15. An apparatus according to claim 13, wherein the Fourier-transforming diffractive optical elements are selected from the group consisting of diffractive zone plates and holographic lenses.

16. An apparatus according to claim 11, wherein the Fourier-transforming means and the imaging means are incorporated in a single diffractive optical element.

17. An apparatus according to claim 8, wherein the Fourier-transforming means further comprises telescopic means to magnify or reduce the Fourier plane.

18. An apparatus according to claim 8, wherein the first image sensor is positioned in or near an optical axis of said at least one Fourier transforming means.

19. An apparatus according to claim 8, wherein the first and/or second image sensor comprises at least one array detector.

20. An apparatus according claim 19, wherein the array detector consists of one one-dimensional array detector.

21. An apparatus according to claim 19, wherein the array detector consists of two one-dimensional array detectors.

22. An apparatus according claim 19, wherein the array detector consists of a two-dimensional array detector.

23. An apparatus according to claim 8, wherein the first and/or second image sensor comprises at least one one-element detector connected to a shift register.

24. An apparatus according to claim 19, wherein a single detector of the array detector or the one-element detector connected to a shift register has a sensitive area of a size comparable with the size of a speckle in or near the Fourier plane.

25. An apparatus according to claim 8, wherein the first image sensor is positioned exactly in the Fourier plane.

26. An apparatus according to claim 8, wherein the electromagnetic radiation is laser light.

27. The method of claim 1 and of determining twist of a rotating object between two or more parts of the object subjected to a load, comprising:
   i) determining the relative shift in angular displacements of one or more parts of the rotating object before and after loading the object, said angular displacements being determined by a method comprising steps a)–g);
   wherein the substantially coherent and substantially parallel electromagnetic radiation directed towards the object is pulsed with a pulse length which allows strobing of the rotating object so that a first and a second one or more distributions of the Fourier-transformed speckles generated by the at least a part of the electromagnetic radiation scattered from said two or more parts of the object are detected before and after the loading of the object, and
   ii) determining the twist between said two or more parts of the object from the determined relative shift in angular displacements and their mutual distances.

28. The method of claim 1 and of simultaneously determining surface translations of one or more parts of the object comprising:
   i) determining the angular displacement of one or more parts of the object before and after the angular displacement, said angular displacement being determined by a method comprising steps a)–g): and
   ii) simultaneously determining the linear displacement of said one or more parts of the object before and after the angular displacement by detecting speckles of said one or more parts of the object in at least one second image sensor positioned in or near the image plane of the Fourier-transforming means.

29. The method of claim 28 and of determining the radius of angular displacement of one or more parts of an object comprising:
   simultaneously determining angular displacements and surface translations of one or more of said parts of the object by a method comprising steps i) and ii),
   and determining the radius of angular displacements from said simultaneously determined angular displacements and surface translations.

* * * * *